United States Patent
Li et al.

(10) Patent No.: US 7,263,147 B2
(45) Date of Patent: Aug. 28, 2007

(54) LOW BIT ERROR RATE ANTENNA SWITCH FOR WIRELESS COMMUNICATIONS

(75) Inventors: Qinghua Li, Pleasanton, CA (US); Xintian E. Lin, Pal Alto, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 10/684,850

(22) Filed: Oct. 14, 2003

(65) Prior Publication Data

US 2005/0088995 A1    Apr. 28, 2005

(51) Int. Cl.
    *H04B 7/10* (2006.01)
(52) U.S. Cl. ................................................ 375/347
(58) Field of Classification Search ........ 375/141–150, 375/267, 347; 370/320, 335, 342, 343, 441; 455/462.1
See application file for complete search history.

(56) References Cited

U.S. PATENT DOCUMENTS

2003/0002471 A1* 1/2003 Crawford et al. .......... 370/343
2004/0204105 A1* 10/2004 Liang et al. ............. 455/562.1

FOREIGN PATENT DOCUMENTS

| EP | 0289384 A1 | 11/1988 |
| EP | 0987838 A1 | 3/2000 |
| EP | 1011282 A2 | 6/2000 |
| WO | WO-9819401 A1 | 5/1998 |
| WO | WO-05039073 A1 | 4/2005 |

OTHER PUBLICATIONS

Honglin, Hu, et al., "A Smart Antennas Scheme Based on 2-dimensional Searching of Beams and Channels and Its Performance Analysis", *Proc. IEEE 55th VTC*, (2002), 1349-1352.

* cited by examiner

*Primary Examiner*—Don N. Vo
(74) *Attorney, Agent, or Firm*—The Law Offices of John C. Scott, LLC

(57) ABSTRACT

A switched antenna system selects an antenna based on symbol error rate.

16 Claims, 3 Drawing Sheets

LOW BIT ERROR RATE ANTENNA SWITCH FOR WIRELESS COMMUNICATIONS

FIELD OF THE INVENTION

The invention relates generally to wireless communications and, more particularly, to antenna selection techniques for use therein.

BACKGROUND OF THE INVENTION

A switched antenna system is a system that selects one out of a group of antennas to support wireless communication at a particular time based on some selection criterion. A switched antenna system may be implemented to overcome problems caused by, for example, multipath fading and/or other channel effects that may decrease the quality of a wireless signal. To be effective, the selection criterion used in a switched antenna arrangement should be capable of reliably identifying an antenna in the group that will result in enhanced performance in a corresponding system.

DETAILED DESCRIPTION

Figure 1:
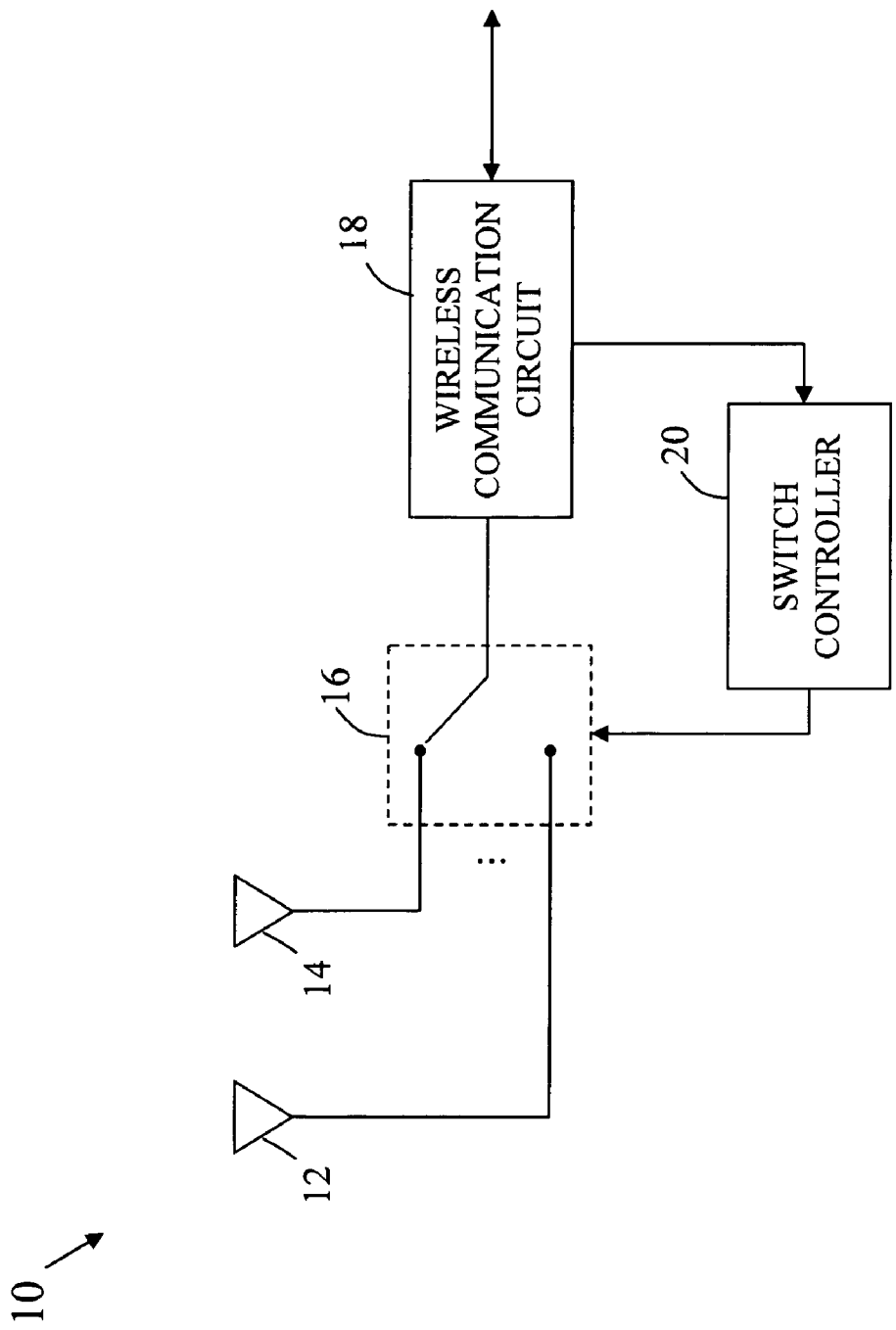
FIG. 1 is a block diagram illustrating an example wireless communication arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a switched antenna arrangement 10 in accordance with an embodiment of the present invention. The switched antenna arrangement 10 may be implemented in any of wide range of different wireless devices, systems, and components including, for example, wireless access points, wireless client devices, wireless network interface cards (NICs) and other wireless network interface structures, cellular telephones and other handheld wireless communicators, personal digital assistants having wireless functionality, pagers, radio frequency integrated circuits (RFICs), and others. As will be described in greater detail, the switched antenna arrangement 10 may be capable of implementing antenna diversity techniques to improve the overall performance of a corresponding device, system, or component. As illustrated, the switched antenna arrangement 10 may include one or more of the following: a number of antennas 12, 14, an antenna switch 16, a wireless communication circuit 18, and a switch controller 20. The wireless communication circuit 18 may include, for example, a wireless receiver, a wireless transmitter, or a wireless transceiver. The wireless communication circuit 18 may also include baseband circuitry to process baseband transmit and/or receive information in the system (e.g., a decoder within a receive chain to decode received information, etc.). The wireless communication circuit 18 may be configured in accordance with one or more wireless communication standards (e.g., wireless networking standards, cellular standards, etc.). In at least one embodiment, for example, the wireless communication circuit 18 is configured in accordance with the IEEE 802.11a wireless networking standard (IEEE Std 802.11a-1999). Other wireless standards and combinations of different standards may alternatively be used.

The antenna switch 16 is operative for coupling a selected one of the antennas 12, 14 to the wireless communication circuit 18 to support communication activity. Although only two antennas are illustrated in FIG. 1, it should be appreciated that any number of antennas (greater than one) may be used. In addition, any type of antennas may be used including, for example, dipoles, patches, helixes, arrays, and others, including combinations of the above. The switch controller 20 controls the operation of the antenna switch 16. That is, the switch controller 20 determines which one of the antennas 12, 14 should be coupled to the wireless communication circuit 18 at a particular time and instructs the antenna switch 16 accordingly. The switch controller 20 may determine which antenna to couple to the wireless communication circuit 18 based on, for example, information received from the wireless communication circuit 18.

In at least one embodiment of the invention, the switch controller 20 selects an antenna based on symbol error rates associated with the antennas of the system. That is, the switch controller 20 may include an error estimator to estimate a symbol error rate for each of the available antennas (or for each of a subset of the available antennas) and select an antenna for use in communication based on the symbol error rates (e.g., selecting an antenna with the lowest symbol error rate, etc.). Various techniques for estimating the symbol error rate associated with an antenna are known in the art. As used herein, the term "symbol error rate" is intended to encompass all different methods and formats for expressing a rate.

In at least one embodiment of the present invention, a switched antenna arrangement is implemented within a wireless communication system that uses multicarrier communication. Multicarrier communication is a technique for transmitting data that divides the data into multiple pieces and then transmits the pieces in parallel via a number of separate narrowband carriers (i.e., sub-carriers). Multicarrier communication is often used to overcome intersymbol interference in channels by increasing the symbol period of the carrier, thus limiting the data rate transmitted though each sub-channel (i.e., by each sub-carrier). When the symbol period transmitted through a sub-channel is longer than the maximum multipath delay in the channel, the effect of intersymbol interference may be reduced significantly. Because multiple carriers are used, relatively high data rates may be achieved overall using multicarrier techniques. Although the effect of intersymbol interference is reduced, multipath fading may still distort the data in a multicarrier system. For example, some of the sub-carriers may experience greater fading than others so that the signal magnitudes received by a receiver are different for different sub-carriers (i.e., non-homogeneous carrier amplitudes). The carriers that experience greater levels of multipath fading will typically have lower signal-to-noise ratios (SNR) at the receiver. These lower SNR sub-carriers in the received signal may compromise the receivers ability to accurately detect the data therein, even when the other sub-carriers in the signal have relatively high SNRs. Thus, antenna selection techniques based on average signal level, SNR, or signal to interference and noise level (SINR) may not be reliable. In at least one embodiment of the present invention, antenna selection is performed in a multicarrier communication system based on average symbol error rates taken over the sub-carriers of a multicarrier signal.

One form of multicarrier communication that is growing in popularity is orthogonal frequency division multiplexing (OFDM). OFDM is used in various wireless communication standards including, for example, IEEE 802.11a (IEEE Std 802.11a-1999), IEEE 802.11g, and others. In an OFDM system, the received signal on each sub-carrier may be represented as follows:

$$r_k(i) = \alpha_k(i) \cdot s(i) + n_k(i)$$

$$i=1,2,\ldots,N; k=1,2,\ldots,K$$

where i is the sub-carrier index, k is the antenna index, s(i) is the transmitted signal for the ith sub-carrier, $r_k(i)$ is the received signal for the ith sub-carrier and the kth antenna, $\alpha_k(i)$ is the channel gain for the ith sub-carrier and the kth antenna, $n_k(i)$ is the noise plus interference for the ith sub-carrier and the kth antenna, N is the number of sub-carriers carrying data, and K is the number of antennas. In at least one embodiment of the present invention, an antenna is selected in a multicarrier system by identifying the antenna with the lowest average symbol error rate (SER) over the sub-carriers. This can be expressed as follows:

$$k_e = \arg\min_k \sum_{i=1}^{N} Pr[e_k(i)]$$

where $Pr[e_k(i)]$ is the symbol error probability for the quadrature amplitude modulation (QAM) symbol on the ith sub-carrier (QAM is the data modulation technique used in, for example, the IEEE 802.11a wireless networking standard). To simplify the required computation, the above expression may be approximated using the error probability between the two closest signal constellation points, as follows:

$$k_e = \arg\min_k \sum_{i=1}^{N} Q\left[\frac{\|\alpha_k(i)d(i)\|}{\sqrt{2}\,\sigma_k(i)}\right]$$

where $$Q(x) = \int_x^{\infty} \frac{1}{\sqrt{2\pi}} e^{-\frac{t^2}{2}} dt$$

is the probability of error in the constellation, d(i) is the shortest distance between two transmitted QAM constellation points (i.e., the row or column spacing in a squared QAM constellation) of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier (i.e., the spacing in the received QAM constellation). Further simplification of the above expression may be achieved by approximating the function Q(x), as follows:

$$k_e = \arg\min_k \sum_{i=1}^{N} Q\frac{\sigma_k(i)}{\|\alpha_k(i)d(i)\|} \exp\left[-\frac{\|\alpha_k(i)d(i)\|^2}{4\sigma_k^2(i)}\right]$$

Any of the above equations may be implemented within the switch controller 20 of FIG. 1 or in other locations within a system.

Figure 2:
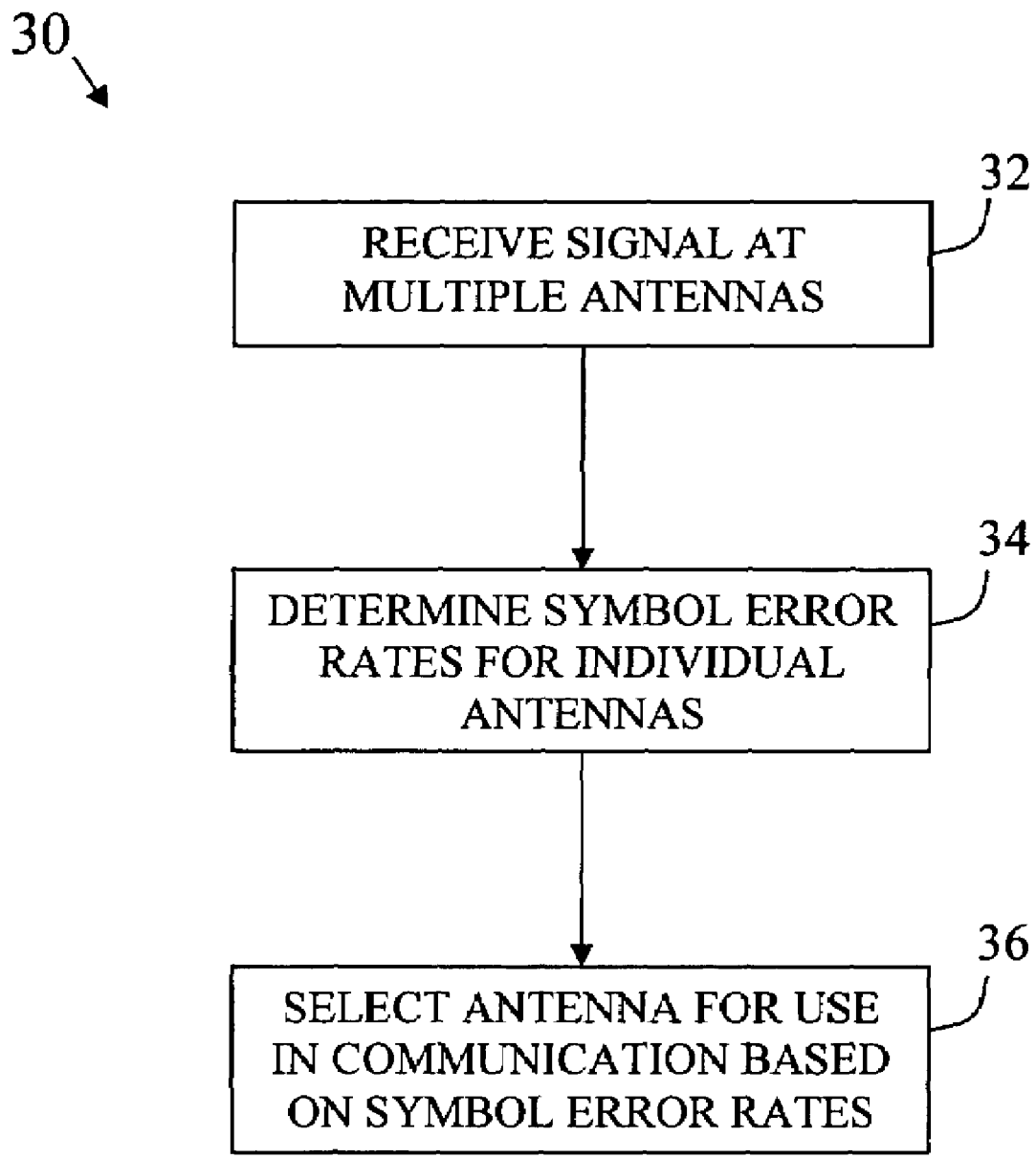
FIG. 2 is a flowchart illustrating an example method for use in selecting an antenna in a wireless communication system in accordance with an embodiment of the present invention.

FIG. 2 is a flowchart illustrating an example method 30 for use in selecting an antenna in a wireless communication system in accordance with an embodiment of the present invention. Signals are received at multiple antennas (block 32) and symbol error rates are determined for each of the multiple antennas based on the corresponding received signal(s) (block 34). The signals may be received at the multiple antennas all at the same time, one at a time, or in some other manner. Similarly, the symbol error rates may be determined for the antennas all at the same time, one at a time, or in some other manner. In one possible approach, a signal is received and a symbol error rate is determined for each antenna of interest, one after another. Other techniques may alternatively be used.

In some systems, a single, non-averaged symbol error rate may be determined for each antenna. In other systems an average symbol error rate may be determined for each antenna. In a multicarrier system, for example, an average symbol error rate may be determined for each antenna over the sub-carriers of the corresponding received signal(s). In a code division multiple access (CDMA) system, an average symbol error rate may be determined for each antenna over the various code sequences of the system. As will be appreciated, the method that is used to determine the symbol error rate associated with an antenna will typically depend upon the specifics of the implementation.

An antenna is subsequently selected for use in communication based on the symbol error rates determined above (block 36). For example, in one possible approach, an antenna is selected that has a lowest symbol error rate. The selected antenna may be used as a receive antenna, a transmit antenna, or as both a receive antenna and transmit antenna. The above-described antenna selection method 30 may be repeated at predetermined times or in response to the detection of a predetermined condition (e.g., a high error rate, etc.). In at least one embodiment, the procedure is repeated for each incoming packet.

Figure 3:
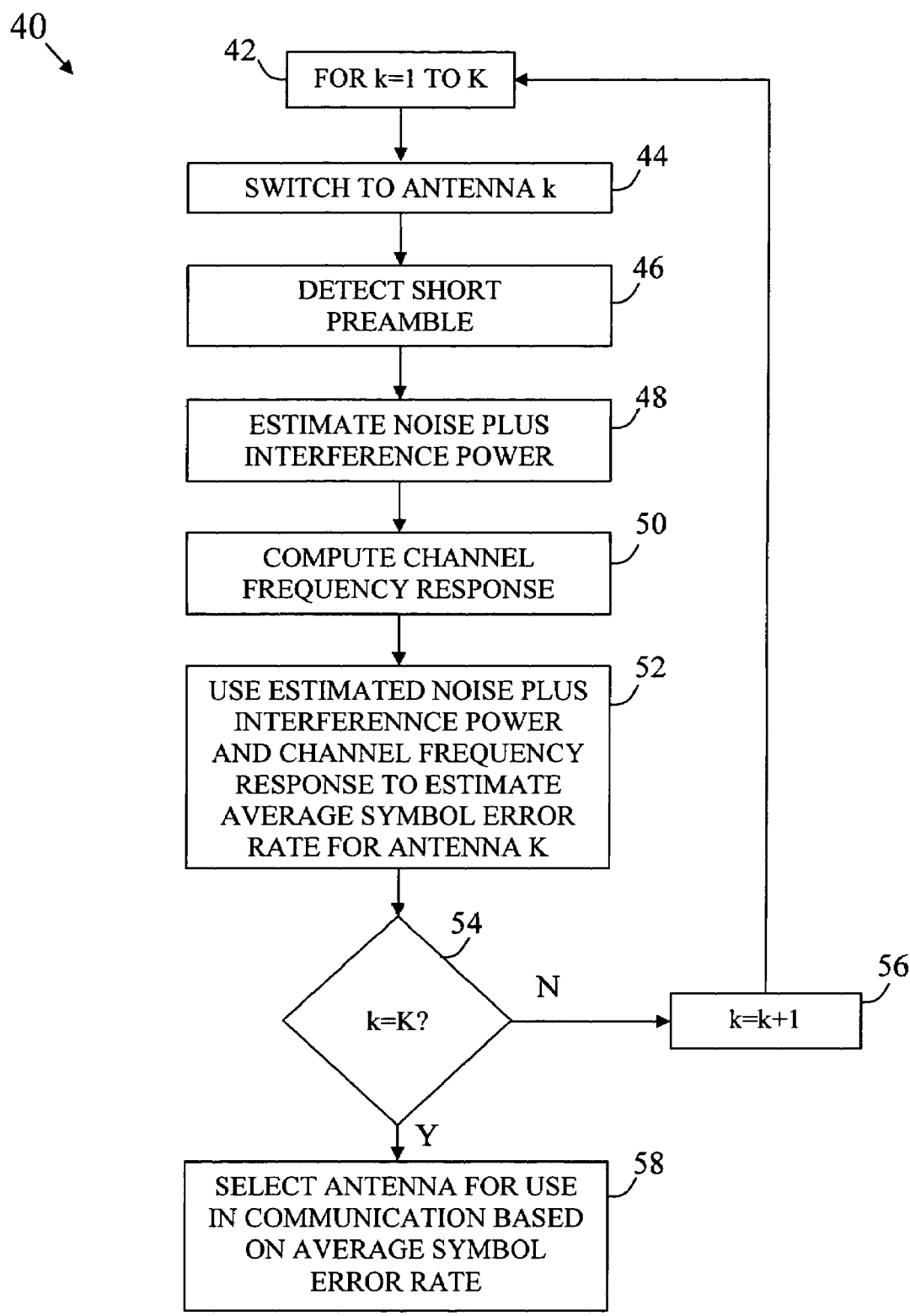
FIG. 3 is a flowchart illustrating an example method for use in selecting an antenna in a multicarrier communication system in accordance with an embodiment of the present invention.

FIG. 3 is a flowchart illustrating an example method 40 for use in selecting an antenna in a multicarrier wireless communication system in accordance with an embodiment of the present invention. In at least one implementation, the method 40 is performed within an IEEE 802.11a based system, although other multicarrier systems may also implement the method 40. The method first switches to a first of K antennas (blocks 42 and 44). A short preamble is next detected using the first antenna (block 46). The detected preamble may then be used to estimate the noise plus the interference power for the first antenna (block 48). A channel frequency response may then be computed for the first antenna (block 50). The estimated noise plus interference power and the channel frequency response may then be used to estimate an average symbol error rate for the first antenna over the sub-carriers of the detected preamble (block 52). This estimation may be performed using, for example, one of the equations discussed previously. Next, it is determined whether average symbol error rates have been estimated for all of the antennas of interest (block 54). Because error rates have not been determined for all antennas of interest, the above procedure is repeated for a next antenna (block 56). After average symbol error rates have been generated for all antennas of interest (block 54), an antenna is selected for use in wireless communication based on the average symbol error rates (block 58). Synchronization and phase tracking may then be performed for the selected antenna. It should be appreciated that an average symbol error rate value does not have to be generated for every antenna associated with a particular device during an antenna selection determination, but may instead be generated for only a subset of the antennas associated with the device. The antenna selection method 40 may be repeated at predetermined times or in response to the detection of a predetermined condition (e.g., a high error rate, etc.). In at least one embodiment, the procedure is repeated for each incoming packet.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in a multicarrier wireless communication system, comprising:
   approximating a sum of symbol error probabilities for each antenna in a group of antennas, said symbol error probabilities being associated with sub-carriers of a multicarrier symbol, wherein approximating includes using a shortest distance between two received signal points for sub-carriers associated with each antenna; and
   selecting an antenna from the group of antennas for use in subsequent wireless communication based on said approximated sums.

2. The method of claim 1, wherein:
   approximating includes evaluating the following equation for each antenna:

$$\sum_{i=1}^{N} Q\left[\frac{\|\alpha_k(i)d(i)\|}{\sqrt{2}\,\sigma_k(i)}\right]$$

where i is a subcarrier index, k is an antenna index, N is a number of subcarriers, $$Q(x) = \int_x^{\infty} \frac{1}{\sqrt{2\pi}} e^{-\frac{t^2}{2}} dt$$

is the probability of error in the constellation, d(i) is the shortest distance between two transmitted constellation points of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier.

3. The method of claim 2, wherein:
   selecting an antenna includes selecting an antenna in the group of antennas that has the lowest approximated sum.

4. The method of claim 1, wherein:
   approximating includes evaluating the following equation for each antenna:

$$\sum_{i=1}^{N} \frac{\sigma_k(i)}{\|\alpha_k(i)d(i)\|} \exp\left[-\frac{\|\alpha_k(i)d(i)\|^2}{4\sigma_k^2(i)}\right]$$

where i is a subcarrier index, k is an antenna index, N is a number of subcarriers, d(i) is the shortest distance between two transmitted constellation points of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier.

5. An apparatus comprising:
   an antenna switch to controllably couple one of a plurality of antennas to a wireless communication circuit; and
   a switch controller to select an antenna from said plurality of antennas to be coupled to said wireless communication circuit for use in supporting wireless communication, said switch controller to approximate a sum of symbol error probabilities for each antenna in said plurality of antennas, said symbol error probabilities being associated with sub-carriers of a multicarrier symbol, wherein the approximation uses a shortest distance between two received signal points for sub-carriers associated with each antenna.

6. The apparatus of claim 5, wherein:
   said switch controller selects said antenna based on the following equation:

$$k_e = \operatorname*{argmin}_{k} \sum_{i=1}^{N} Q\left[\frac{\|\alpha_k(i)d(i)\|}{\sqrt{2}\,\sigma_k(i)}\right]$$

where i is a subcarrier index, k is an antenna index, $k_e$ is the selected antenna, N is a number of subcarriers, $$Q(x) = \int_x^\infty \frac{1}{\sqrt{2\pi}} e^{-\frac{t^2}{2}} dt$$

is the probability of error in the constellation. d(i) is the shortest distance between two transmitted constellation points of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier.

7. The apparatus of claim 5, wherein:
said switch controller selects said antenna based on the following equation:

$$k_e = \underset{k}{\mathrm{argmin}} \sum_{i=1}^{N} \frac{\sigma_k(i)}{\|\alpha_k(i)d(i)\|} \exp\left[-\frac{\|\alpha_k(i)d(i)\|^2}{4\sigma_k^2(i)}\right]$$

where i is a subcarrier index, k is an antenna index, $k_e$ is the selected antenna, N is a number of subcarriers, d(i) is the shortest distance between two transmitted constellation points of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier.

8. The apparatus of claim 5, wherein:
said switch controller generates a switch control signal for said antenna switch.

9. The apparatus of claim 5, wherein:
said wireless communication circuit includes a wireless transmitter.

10. The apparatus of claim 5, wherein:
said wireless communication circuit includes a wireless receiver.

11. The apparatus of claim 5, wherein:
said wireless communication circuit includes a wireless transceiver.

12. A system comprising:
a plurality of antennas that includes at least one dipole antenna;
an antenna switch to controllably couple one of said plurality of antennas to a wireless communication circuit; and
a switch controller to select an antenna from said plurality of antennas to be coupled to said wireless communication circuit for use in supporting wireless communication, said switch controller to approximate a sum of symbol error probabilities for each antenna in said plurality of antennas, said symbol error probabilities being associated with sub-carriers of a multicarrier symbol, wherein the approximation uses a shortest distance between two received signal points for sub-carriers associated with each antenna.

13. The system of claim 12, wherein:
said switch controller selects said antenna based on the following equation:

$$k_e = \underset{k}{\mathrm{argmin}} \sum_{i=1}^{N} Q\left[\frac{\|\alpha_k(i)d(i)\|}{\sqrt{2}\,\sigma_k(i)}\right]$$

where i is a subcarrier index k is an antenna index, $k_e$ is the selected antenna, N is a number of subcarriers, $$Q(x) = \int_x^\infty \frac{1}{\sqrt{2\pi}} e^{-\frac{t^2}{2}} dt$$

is the probability of error in the constellation. d(i) is the shortest distance between two transmitted constellation points of the ith sub-carrier, $\sigma_k(i)$ is the square root of the variance of the noise plus interference for the ith sub-carrier and the kth antenna, and $\|\alpha(i)d(i)\|$ is the shortest distance between two received signal points of the ith sub-carrier.

14. The system of claim 12, wherein:
said switch controller selects said antenna based on the following equation:

$$k_e = \underset{k}{\mathrm{argmin}} \sum_{i=1}^{N} \frac{\sigma_k(i)}{\|\alpha_k(i)d(i)\|} \exp\left[-\frac{\|\alpha_k(i)d(i)\|^2}{4\sigma_k^2(i)}\right]$$

where i is a subcarrier index, k is an antenna index, $k_e$ is the selected antenna. N is a number of subcarriers, d(i) is the shortest distance between two transmitted constellation points of the ith sub-carrier, $\sigma_k(i)$ is the square root of the variance of the noise plus interference for the ith sub-carrier and the kth antenna, and $\|\alpha_k(i)d(i)\|$ is the shortest distance between two received signal points of the ith sub-carrier.

15. The system of claim 12, wherein:
said system is part of a wireless access point.

16. The system of claim 12, wherein:
said system is part of a wireless network interface card (NIC).

* * * * *